United States Patent

[11] 3,542,139

| [72] | Inventor | Harry L. Mowbray |
| | | 109 S. 3rd St., Medford, Oklahoma 73759 |
| [21] | Appl. No. | 864,637 |
| [22] | Filed | Oct. 8, 1969 |
| [45] | Patented | Nov. 24, 1970 |

[54] ROTARY HARROW WHEEL
7 Claims, 3 Drawing Figs.

[52] U.S. Cl. .................................................. 172/540,
172/748
[51] Int. Cl. ........................................................ A01b 21/02
[50] Field of Search ........................................... 172/540,
548, 547, 748

[56] References Cited
UNITED STATES PATENTS
514,066  2/1894  Drader .......................... 172/548X 1,322,447  11/1919  Irwin et al. ........................ 172/548X
2,560,359  7/1951  McCardell ......................... 172/548X
FOREIGN PATENTS
176,056  2/1953  Austria ............................ 172/548

Primary Examiner—Robert E. Pulfrey
Assistant Examiner—James W. Peterson
Attorney—Miller and Brown ABSTRACT: The invention is a welded construction spiked-tooth tillage wheel particularly suited for the "stubble mulch" method of farming. The wheel is fabricated in two identical dish-shaped half sections, each carrying one half of the teeth on the wheel. The half sections are joined by a common ring member concentrically spaced between the sections with the individual teeth members extending outward from their respective hub of each half section to the ring member with all of the teeth having an equal angular spacing around the wheel.

Patented Nov. 24, 1970

3,542,139

HARRY L. MOWBRAY

BY Miller & Brown

ATTORNEYS

ROTARY HARROW WHEEL

BACKGROUND OF THE INVENTION

The invention relates to a rotary spiked-tooth harrow which is an agricultural tillage implement specifically suited for stubble mulch farming. In this method of farming, also referred to an "crop residue management", the stubble or residue remaining from the previous years crop is left in place to form a cover for protection against wind and water erosion and to conserve the moisture in the soil. When the ground is worked to kill weeds and prepare a bed for the new seed, it is cultivated immediately below the surface while leaving the stubble for the previous crop as little disturbed as possible.

One type of implement utilized in this type of farming is a shallow draft sweep plow. This type of plow provides a wide horizontal V-shaped blade which passes through the ground immediately below the surface, cutting the roots of weeds and loosening the top soil without moving the stubble out of place or turning it under as done with the conventional moldboard plow. The rotary harrow wheels of the present invention, when drawn in gangs behind the sweep plow, further till the soil for seeding. As the wheels pass over the soil the teeth pierce the trash or stubble layer to effectively work the soil at the surface to kill the small weeds the plow has left undisturbed, yet do not appreciably diminish the residue at the surface. The gangs of wheels are carried on a common shaft for free rotation, as the implement is pulled along the ground. The implement can adjustably vary the angle of the shaft relative to the line of draft to change the ground working effect.

The harrow wheel of the present invention provides a more satisfactory cultivation of the soil than the rotary harrows presently being used due to a variety of unique features. The concave shape of the wheel will throw the trash, that catches on the teeth, much more effectively than a planar type wheel, as illustrated in U.S. Pat. No. 2,600,332. The dish-shape also provides an increased action as the teeth move through the top soil. This improved action is also attributable to the separate plane of movement of the spikes on one half section of the wheel with respect to those on the other section. The distance between the planes increases the distance between points on two succeeding spikes, thus providing a better action.

It is therefore the principal object of the present invention to provide spiked-tooth harrow wheels with an improved action that will better cultivate the top surface of the soil without disturbing the stubble.

Another object of the present invention is to provide a spiked-tooth harrow wheel with a built-in trash guard to prevent the crop residue from balling-up on the wheels and rotating shafts.

Another object of the invention is to provide harrow wheels with teeth capable of piercing the trash to effectively till the soil, yet being designed with self-cleaning characteristics to provide for the release of the trash thereby preventing any accumulation by the implement.

A further object of the invention is to provide a spiked harrow wheel of simplified low cost welded construction that can be made with any even number of teeth.

Another object of the invention is to provide a spiked harrow wheel made up in two half sections joined by a novel spreader ring in an offset relation to each other.

A further object of the invention is to provide a rack guard which prevents rocks from wedging between the teeth of the wheel.

The invention will be more clearly understood when the following description is read in connection with the accompanying drawings, in which.

Figure 1:
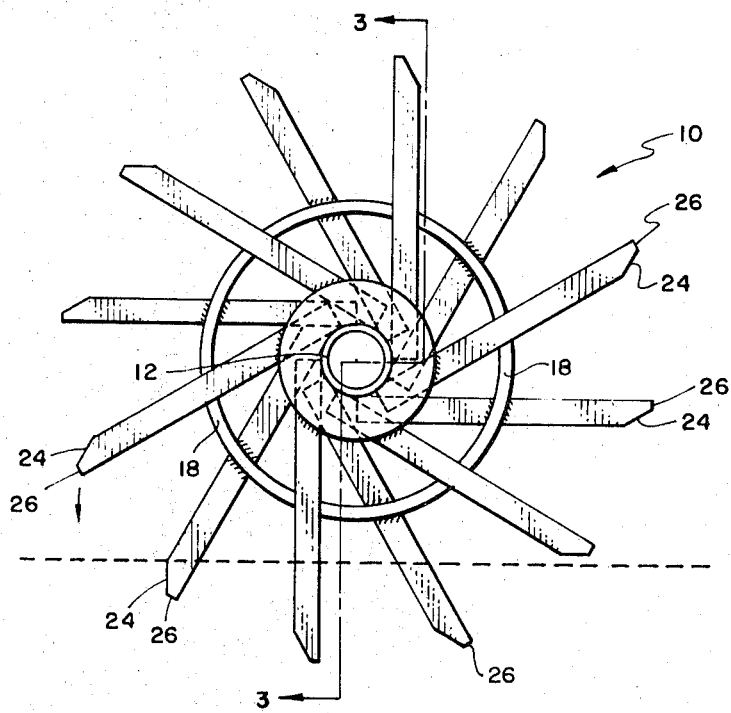
FIG. 1 is a plan elevational view of the rotary harrow wheel.

Referring now to the drawings, and more specifically to FIG. 1, the spiked-tooth wheel is generally identified by reference numeral 10. While the drawings only show a single wheel, they are utilized in gangs mounted on a shaft 12 at spaced intervals along the length of the shaft.

Figure 2:
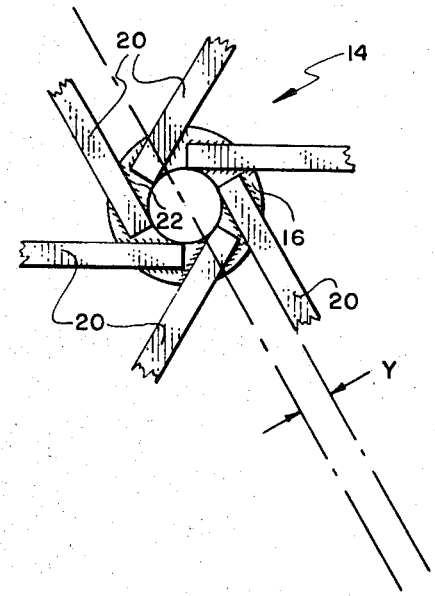
FIG. 2 is a fragmentary view of a half section of the wheel taken along line 2-2 of FIG. 3.
Figure 3:
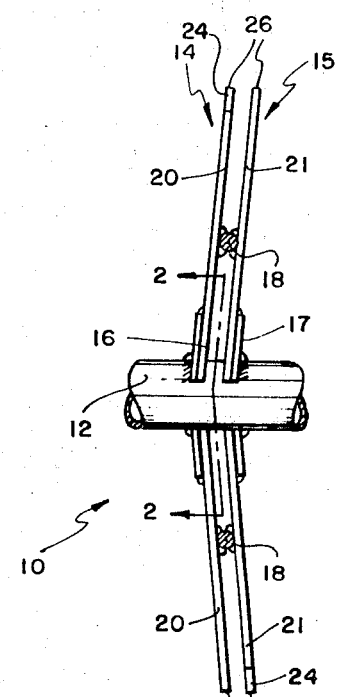
FIG. 3 is a sectional view taken along line 3-3 of FIG. 1.

The wheel 10 is fabricated from an entirely welded construction, including two half sections 14 and 15, each carrying half of the desired number of spikes on the wheel. The sections are joined in spaced-apart relation by a spreader ring 18 as seen in FIG. 3. Half section 14 as shown in FIG. 2, comprises a dish-shaped hub member 16 supporting five spike members 20 spaced 60° apart. The flat spike members 20 which could also be constructed of round, square or half oval stock, are welded to the concave surface 22 of the hub 16 forming the half section in a dish shape. Each spike 20 is positioned on the hub 16 with its longitudinal axis offset a distance y from the center of the hub. This offset positioning provides a better action and release from the soil. When the angular position of the teeth is too near the radial, the penetration will be ineffective.

The half section 15 is identical to section 14, except the spikes 21 are connected to the convex side of hub member 17. The six spike members 21 are angularly positioned on hub member 17 in an identical manner as in half section 14. When the two half sections are assembled, a spreader ring 18 is sandwiched therebetween in concentric relation. The half sections 14 and 15 are angularly positioned with respect to each other so that there is an equal angular spacing of approximately 30° between each spike. Each of the spikes 20 and 21 is welded to the ring 18, as seen in FIG. 3, thus connecting the two sections into a unitary structure. The welded connection of each spike with the ring gives added strength to the spikes and the overall wheel. The ring 18 also functions as a trash or rock guard in keeping the pierced stubble away from the hub 16. Rocks are also prevented from wedging between the spikes. The leading edge of each spike has an inclined portion 24 at its point to prevent packing of the soil upon entry. The degree of incline and sharpness of the point 26 are varied depending upon the use of the wheel. While the wheel 10 is shown with 12 spikes, it can also be made with any other even number, depending upon its use.

OPERATION

In the normal manner, gangs of rotary harrow wheels are pulled across the ground with the plane of the wheel being positioned at an acute angle with the line of draft of the implement, or in other words, the wheel 10 is not in line with its path of movement. The purpose for this being the increased cultivation of the soil. The forming of the wheel with the spikes in a dish-shape rather than flat, causes a better ground working action and allows the spike members to better release the pierced trash, giving it a self-cleaning function. Another feature which improves the ground working effect is the alternate positioning of the spikes in separate planes of movement, which can be seen in FIG. 3. By the offset positioning, the distance between each successive spike points 26 is increased, and an improved crosscut action is transmitted to the soil.

I claim:

1. A rotary spiked-tooth harrow wheel for use in gangs on the supporting shaft of an agricultural tillage implement comprising:

two half sections, each section including a dished-shaped annular hub means rigidly attached to the supporting shaft and a plurality of spike members attached to each separate hub means extending outward equally angularly spaced from each other in a dish-shaped; and a ring member having a radius less than the length of the spike member, concentrically positioned between the convex side of one half section and the concave side of the other half section attached to the individual spikes of each section to form a unitary wheel structure whereby the spikes of one section lie in a conical plane parallel to the other section.

2. A rotary spiked-tooth harrow wheel as set forth in claim 1, wherein the hub means of the first half section includes a concave mounting surface for the spike members which extend outwardly in a dish-shaped wheel; and the hub means of the second half section includes a convex mounting surface for the spike members of its section which extends outwardly in a similar dish-shaped wheel.

3. A rotary spiked-tooth harrow wheel as set forth in claim 1, wherein an equal number of spikes are positioned on each half section, and the sections are positioned on the ring member relative to each other so that all of the spikes of both sections have equal angular spacing.

4. A rotary spiked-tooth harrow wheel as set forth in claim 1, wherein the hub means of each section is a dish-shaped washer.

5. A rotary spiked-tooth harrow wheel as set forth in claim 1, wherein the hub means of each section is a dish-shaped washer, and the ring member has a radius substantially one half the length of the spike members.

6. A rotary spiked-tooth harrow wheel as set forth in claim 1, wherein the hub means of each section is a dish-shaped washer; the spike members being rectangular in cross section with a tapered outer end.

7. A rotary spiked-tooth harrow wheel as set forth in claim 1, wherein the hub means of each section is a dish-shaped washer; all of the spike members being attached to the washers offset from the radial a distance greater than the inside radius of the washer.